Dec. 1, 1942.　　　　H. H. COOK　　　　2,303,684
PORTABLE CONVEYER
Filed Nov. 15, 1939　　　3 Sheets-Sheet 1
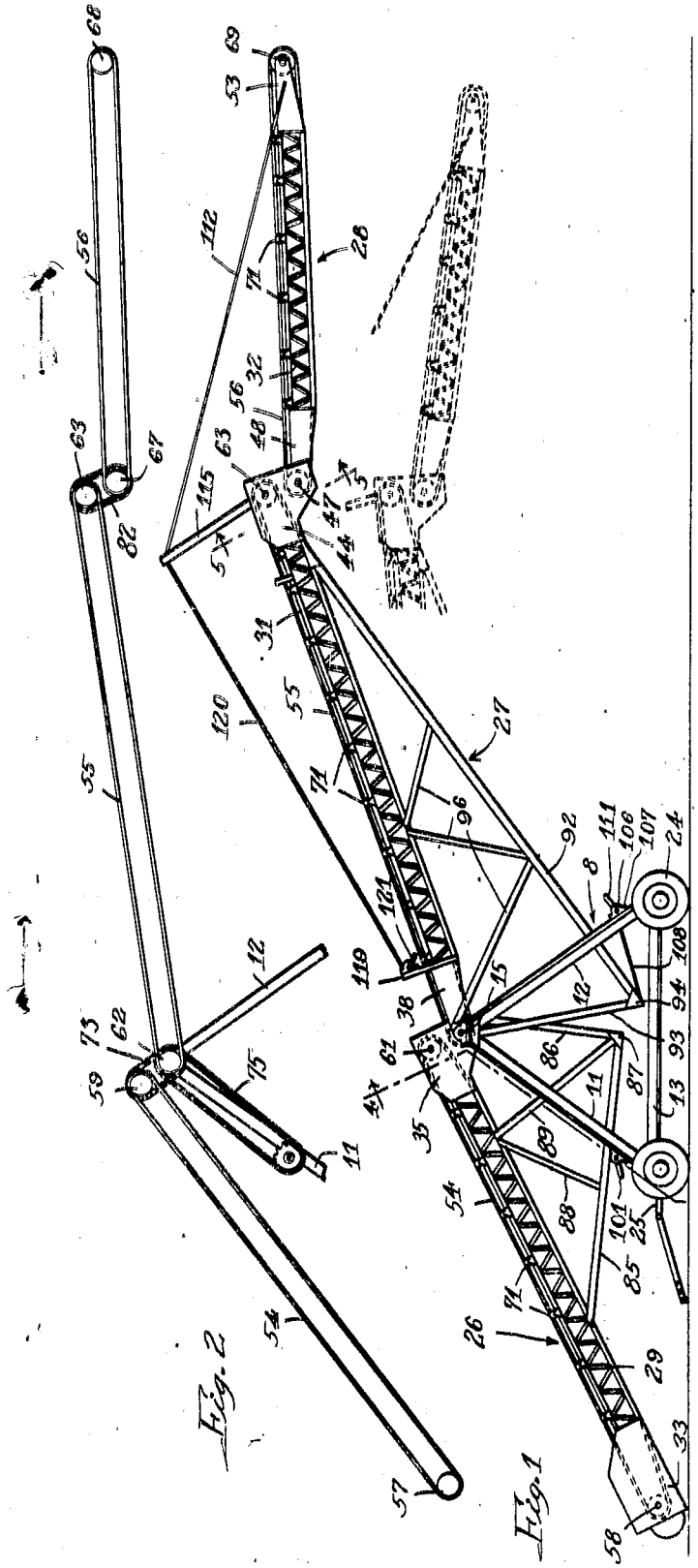
Inventor:
Harold H. Cook
By McCanna, Kintersorn & Morsbach
Attys.

Dec. 1, 1942.            H. H. COOK                2,303,684
                      PORTABLE CONVEYER
                   Filed Nov. 15, 1939          3 Sheets-Sheet 2
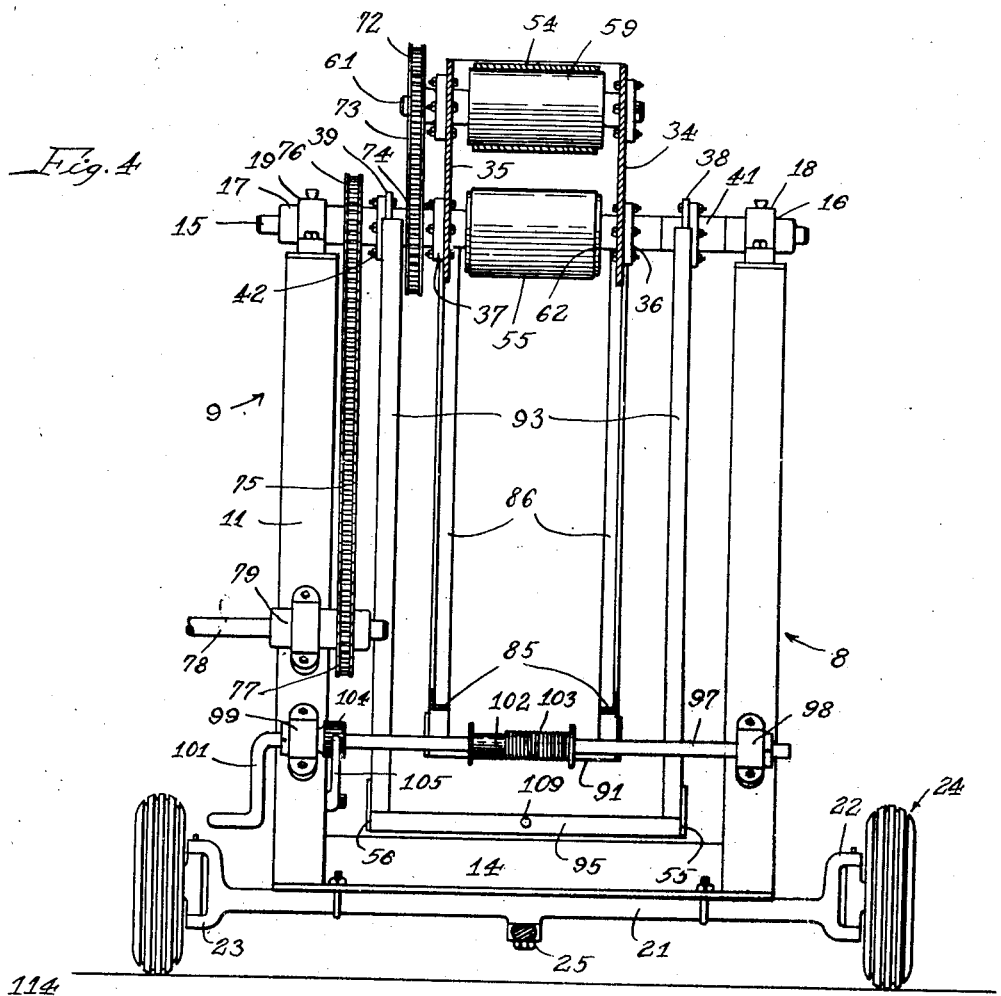

Dec. 1, 1942.  H. H. COOK  2,303,684
PORTABLE CONVEYER
Filed Nov. 15, 1939  3 Sheets-Sheet 3
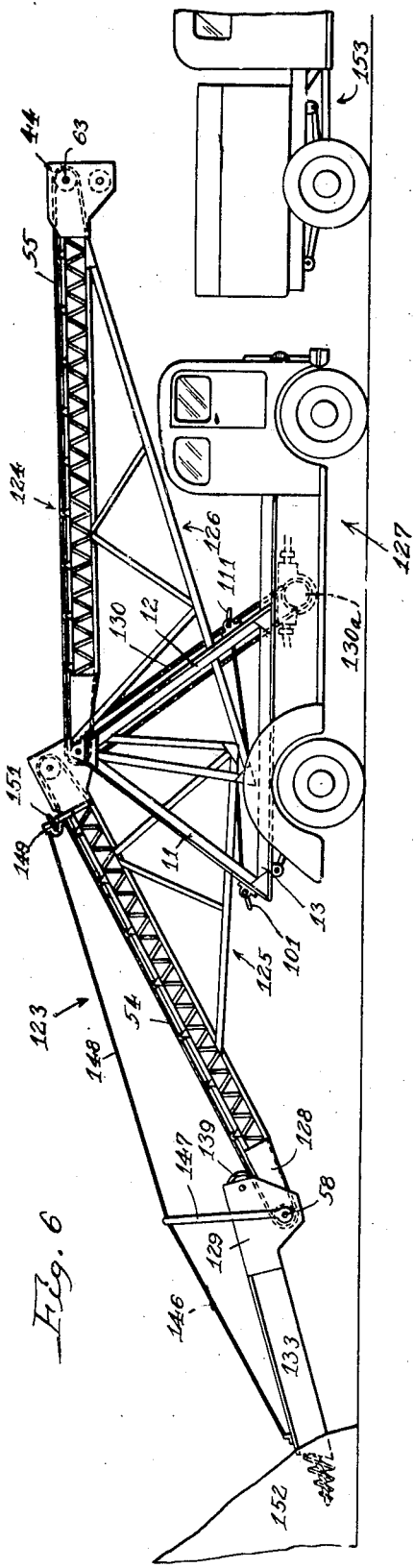
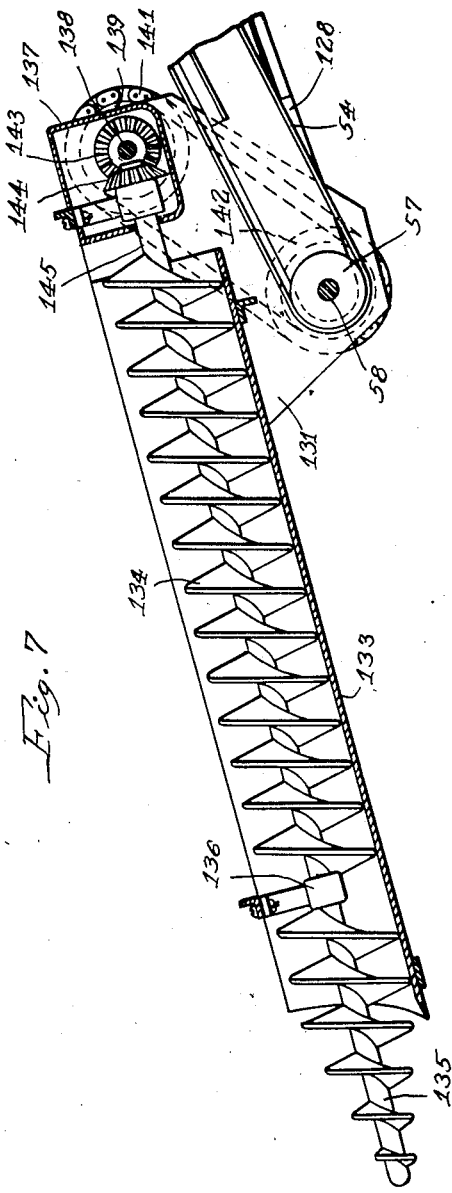
Inventor:
Harold H. Cook
By
McCanna, Wintercorn & Morsbach
Attys.

Patented Dec. 1, 1942

2,303,684

UNITED STATES PATENT OFFICE 2,303,684

PORTABLE CONVEYER

Harold H. Cook, Steward, Ill.

Application November 15, 1939, Serial No. 304,479

11 Claims. (Cl. 198—87)

This invention relates to material conveyers and has special reference to conveyers of the portable type adapted to be conveniently moved from place to place.

Portable material conveyers have long been known in the art, but these have always been open to certain serious objections. One of these objections is the difficulty which is encountered in moving them from place to place, this being particularly true of the so-called "belt" conveyers, or conveyers operating on a similar principle, whether the material is carried on a belt or in buckets, or the like. When these conveyers are made in any length, an acute problem is presented in connection with their transportation over the highways. In the past these conveyers have been usually mounted on a relatively light two-wheeled truck or caster, and have been dismantled when it became necessary to transport them on the highways since the conveyers are usually so long in overall length that they exceed the maximum set up by most state highway departments and because in those devices of which I am aware, the structures do not have sufficient rigidity and such balance as to withstand such usage. This situation is further aggravated by the fact that it is necessary to tow the conveyer behind some leading vehicle such as a truck, which further increases the overall length of the train.

An important object of the invention is to provide a portable conveyer that meets the requirements necessary to efficiently build stock piles, load trucks and hoppers on difficult material elevating jobs and like purposes and which may yet be easily and speedily transported on the highway in compliance with the legal head room and overall length requirements.

Another object of the invention is to provide a general utility conveyer incorporating the belt conveyer principle that is sufficiently long to span the distance required by difficult jobs and to elevate materials to the desired height, and that may be legally transported on the highway.

A further object of the improvements is to provide a portable conveyer that may be moved to the scene of operation and placed into commission without assembling, and removed therefrom without dismantling, by a single operator.

A still further object of the invention is the provision of a self-driven and self-propelled conveyer arranged to be collapsed for movement over the highway.

I have also aimed to provide a self-propelled and self-loading conveyer.

Other objects will appear from the following description and the accompanying drawings, in which—

Figure 1 is a side elevation of a portable conveyer embodying my invention;

Fig. 2 is a diagrammatic view showing one suitable way of driving the conveyer belts;

Fig. 3 is a side elevation of the conveyer showing the parts in position for transportation and with the tow vehicle in position;

Fig. 4 is a view of the front end of the conveyer taken on a vertical plane, part of the conveyer being in section;

Fig. 5 is a section on the line 5—5 of Figure 1;

Fig. 6 is a side elevation of another embodiment of the invention, and

Fig. 7 is a longitudinal section through one end of the conveyer of Fig. 6 and the associated loading mechanism.

The invention contemplates a conveyer of a mobile nature and includes a conveyer portion proper and supporting means for the conveyer portion. The supporting means may take either of two general forms, each of which has its particular advantages, but which has certain salient features in common. The more simple form is that shown in Figs. 1 to 5, wherein the conveyer is supported on a frame work which is in turn supported by wheels, the whole being adapted to be towed behind a tow vehicle, as, for example, a truck. In the second form, shown in Figs. 6 and 7, the conveyer portion is mounted on the truck, the wheels of the truck serving to transport the machine from place to place. The latter form is somewhat more expensive and somewhat more limited in its field of use, but it possesses certain advantages in that the motive power of the truck may be used for driving the conveyer and, furthermore, self-loading devices may be incorporated in the conveyer due to the fact that the conveyer is self-propelling and can be actuated to move the loading devices into engagement with the stock.

Referring first to the form shown in Figs. 1 to 5, inclusive, the frame work supporting the conveyer proper is in this instance formed of two triangles designated generally by the numerals 8 and 9, each formed of L beams 11, 12 and 13. These triangles are joined at the ends of their bases by cross members 14 (Fig. 4) and at their apexes by a cross shaft 15, journaled at 16 and 17 in bearings 18 and 19 on the triangles. The frame structure is supported upon conventional axles as shown at 21 which may have conventional steering knuckles 22 and 23 for the support of rubbertired wheels as indicated at 24 for pivotal support of the wheels, or the wheels may be supported on a fixed spindle. A tongue 25 is attached to the axles 21 and projects forwardly for attachment to a tow truck in the conventional manner.

For purpose of illustration I have herein shown a conveyer which comprises three sections indicated generally by the numerals 26, 27 and 28, though additional sections may be added thereto in a manner which will be apparent from the teachings of this application. The sections 26 and 27 are pivotally supported on the cross shaft 15, while the section 28 is pivotally carried on the end of section 27. Each of the sections is similarly constructed with respect to the type of beams which in this instance comprise a truss structure indicated at 29, 31 and 32, this general type of structure being well known in the art and commonly used in the manufacture of conveyers of this general nature. The beams or trusses 29, 31 and 32 have structural plates on opposite sides thereof at each of their ends, the section 26 having structural plates 33 at its free end and plates 34 and 35 at its opposite end, these plates being secured to flanged bearings 36 and 37 (Fig. 4) carried on the cross shaft 15. The section 27 has structural plates 38 and 39 secured to the opposite sides of one end thereof and to flanged bearings 41 and 42 journaled on the cross shaft 15, these bearings serving to support the section on the shaft. The opposite end of the section 27 has structural plates 43 and 44 which carry flanged bearings 45 and 46 within which is positioned a shaft 47 spanning the distance between the structural plates 43 and 44 for a purpose presently to be described. Structural plates 48 and 49 are attached to one end of the section 28 and to flanged bearings 51 and 52 carried on the shaft 47, the flanged bearings serving to rotatably support the section 28 on the end of section 27, as will be apparent from Figs. 1 and 5. The opposite end of the section 27 has structural plates 53 attached to the opposite end thereof.

Positioned on each of the conveyer sections are conveyer belts, the section 26 having a conveyer belt 54, the section 27 a belt 55, and the section 28 a belt 56. These belts extend from end to end of the section and are formed of the usual material. It will be understood that in the art these belts take many different forms depending upon the work, sometimes being merely smooth belts, other times having transverse slots and sometimes being in the form of chains having buckets attached thereto. I have herein shown one type for purpose of illustration, but other types will, of course, be used in accordance with conventional practice. The belt 54 is supported on a roll 57, which roll is carried on a shaft 58 extending between the plates 33, and is also trained over a drum 59 carried on a shaft 61 extending between the plates 34 and 35. Likewise, the belt 55 is trained over drums 62 and 63 located at opposite ends of the section 27, the drum 62 being rotatably supported on the shaft 15, while the drum 63 is rotatably supported on a shaft 64 positioned in bearings 65 and 66 bolted to the structural plates 43 and 44 (Fig. 5). The belt 56 is carried on section 28 and is trained over drums 67 and 68, the drum 67 being rotatably supported on the shaft 47 (Fig. 5), and the drum 68 being rotatably carried on a shaft 69 extending between the structural plates 53 at the free end of the section 28. Each of the sections has a plurality of rollers 71 which function to support the belts intermediate the ends of the sections in a manner well known in the art.

While the particular manner of driving the belts forms no part of the present invention, in this instance the belt 54 is driven from the drum 59, the drum being fixed to the shaft 61 to which is also attached a sprocket 72 over which is trained a chain 73, which chain engages a sprocket 74 fixed to the shaft 15. The shaft 15 is in turn driven by a chain 75 which engages a sprocket 76 fixed thereto, the chain 75 engaging a sprocket 77 carried on a drive shaft 78, which shaft is journalled in a bearing 79 attached to the frame structure as to the beam 11. The shaft 78 can be driven by any suitable prime mover, as, for example, by a separate motor provided for that purpose, or it may conveniently be driven from a power take-off on a conventional automotive truck. The belt 55 being trained over the drum 62 which is affixed to the shaft 15, is thereby driven and in turn serves to rotate the drum 63. The drum 63 is fixed on the shaft 64 which also carries a sprocket 81 over which is trained a chain 82 which engages a sprocket 83 fixed to the shaft 47, thereby serving to drive the shaft 47 and also the drum 67 which is attached thereto. The drum 67 drives the belt 56 which idles over the drum 68 at the free end of section 28. It will be seen that with this arrangement for driving the belts, the sections may be swung about their pivot points so as to vary the relative inclinations thereof without in any way disturbing the drive. Thus these sections may be swung from the positions shown in Figure 1 to the positions shown in Fig. 3 without disengaging the drive mechanism in any particular.

Each of the sections 26 and 27 is provided with bracing structure which also serves in the movement of these sections about the shaft 15. Thus the section 26 has a frame work which includes laterally spaced frame members 85 and laterally spaced frame members 86 connected at the point 87 to form with the beam 29 a triangular frame structure. These members are braced by intermediate bracing members 88 and 89 to form a rigid structure. The laterally spaced frame members 86 and 88 are interconnected at the junction 87 by a connecting bar 91 (Fig. 4). Likewise the conveyer section 27 has laterally disposed frame members 92 and laterally disposed frame members 93 connected at the point 94 and having a cross member 95 (Fig. 4), the frame structure being provided with intermediate bracing members 96 to lend the structure suitable rigidity.

These frame structures serve in the adjustment of the angle of inclination of the conveyer sections. For this purpose a windlass shaft 97 is rotatably supported in bearings 98 and 99 carried on the beams 11, as best shown in Fig. 4, the end of the shaft having a crank 101 for the purpose of rotating the shaft. The shaft has a spool 102 around which is wound a cable 103, the end of the cable being attached to the crosspiece 91 so that as the cable is wound up on the spool 102, the section 26 is rotated in a clockwise direction facing Figure 1, whereby it may be rotated from the position of Figure 1 into the position of Fig. 3. Contrariwise, when the cable is unwound, the section is lowered toward the position of Figure 1. The shaft 97 has a ratchet gear 104 fixed thereto against which a gravity actuated pawl 105 acts whereby to prevent rotation of the spool and shaft under the weight of the section and thereby retain the section in any desired angle of inclination. A similar arrangement is provided for rotating the section 27, this including a shaft 106 carried in bearings 107 positioned on the frame members 12 and having a spool similar to the spool 102 for supporting a cable, as shown at 108, which is attached to the cross-piece 95 as shown at 109 (Fig. 4). Thus, by rotating a crank 111 positioned on the shaft 106 the angle of inclination of the section 27 may be varied within the range required for operation of the device. It will be seen that such rotation also varies the elevation of the section 28. The angle of the section 28 is varied by means of spaced cables 112 which are attached at one end to the structural plates 53 and at their opposite ends are attached as shown at 113 and 114 to a U bar 115 which has pivotal bearings 116 and 117 at its ends for rotation on the shaft 64. A cable 120 is attached to the center of the U bar 115, as shown at 118, and is wound over a spool similar to the spool 102 carried on a transverse shaft attached to brackets 119, the shaft being rotated by a crank 121 to rotate the U bar 115 and thereby move the free end of the section 28 upwardly or downwardly. The connection between the plates 53 and the cables 112 is releasable so that the U bar may be drawn into the position shown in Fig. 3, and the section 28 may be released to be swung into the folded position shown therein.

One of the common positions in which the conveyer is used is shown in Figure 1. The material to be conveyed is loaded onto the conveyer belt 54 above the drum 57 and is conveyed upward, dropping from the belt at the drum 58 and thus onto the belt 55. At the drum 63 the material is likewise transferred to the belt 56, falling from this belt at the drum 68 to the required position. It has been common, in the past, to make conveyers of this type and size of a single belt and beam structure extending the full length, the customary length being about sixty feet. It will be seen from an examination of this figure that a device so made cannot be transported over the highways since an addition eighteen to twenty feet must be added onto the device as the result of placing a tow truck at the forward end thereof. However, in accordance with my invention, the section 26 is elevated to the position shown in Fig. 3, whereby the tow truck in substantial part occupies the position beneath this section and the sections have been so constructed as to be incapable of withstanding such usage and withstanding relatively high speed transport such as provided by a truck, tractor or other automotive vehicle. Likewise the section 27 is lowered to the position shown in Fig. 3, and the section 28 is folded up as shown in this figure. This folding of the section 28 is accomplished by lowering the section 28 to the vertical position, thereupon releasing the cables 112 and then manually swinging the section 28 to the position shown in Fig. 3, pins 122 being inserted through the structural plates 53 and bearing against the frame member 92 to hold the section in the folded position. The crank 21 is then operated to pull the U bar 115 into the folded position, thereby bringing the parts into the position for transportation. It will be seen that in this position the overall length of the device is scarcely more than about forty feet for a sixty foot conveyer and its associated tow car. Furthermore, it will be noted that these operations can be conducted by one man without in any way disassembling the parts of the device, and the conveyer can be re-converted to its operative condition in a very short time, thus greatly facilitating the use of a conveyer of this type on what might be termed "short time jobs." This is particularly important in the work of highway contractors and the like, where work is conducted at a plurality of points and only a relatively short service is required of the conveyer.

In Figs. 6 and 7 I have shown a modified form of the device embodying substantially the same principles but utilizing a different embodiment thereof. In this form of the invention I have shown a conveyer section 123 substantially similar in structure to the section 26, and a conveyer section 124 substantially similar to the conveyer section 27, the section 123 having a frame structure 125 similar to the frame structure of the section 26, and the section 124 having a frame structure 126 similar to the frame structure of the section 27. In this instance the supporting frame members 11, 12 and 13 are supported on the frame of a truck designated generally by the numeral 127. In this instance the shaft 15 is driven by means of a chain 130 from a sprocket attached to the power take-off 130a of the truck in the usual manner.

Attached to the free end 128 of the section 123 is a self-loading mechanism shown best in Fig. 7. This includes a feeder frame having side plates 129 and 131 pivotally carried on the shaft 58 of section 123. These plates are attached to a chute 133 of semi-circular cross-section within which is positioned an auger 134, which auger is tapered inwardly toward its end as shown at 135 and projects beyond the end of the chute. Intermediate its ends the auger is supported in the chute on a bearing 136. At the rear end of the chute and between the plates 129 and 131 is a gear box 137 having a shaft 138 driven by a sprocket 139 and a chain 141, the chain being trained over a sprocket 142 on the shaft 58. Positioned on the shaft 138 within the gear box is a bevel gear 143 which drives a bevel gear 144 attached to the shaft 145 of the worm, the shaft extending through the side of the gear box. The inclination of the self-loading section is controlled by cables 146 similar to the cables 112 attached to a U bar 147 similar to the U bar 115 to which is attached a cable 148 trained on a spool 149 rotated by a crank 151 having ratchet mechanism for retaining the self-feeding mechanism at a desired degree of inclination.

It will be seen that with this form of the invention the operator may bring the parts into the position shown in Fig. 6, and thereupon by the use of the motive power of the truck press the point of the worm 134 into a stock pile herein indicated at 152. The worm carries the material from the stock pile upwardly and deposits the same on the belt 54 of section 123, which in turn deposits it on the belt of section 124 from which it drops into a truck designated generally by the numeral 153. This is, of course, by way of example of the use of the device for loading trucks from a stock pile. It will be seen that in this form the self-feeding section can be rotated downwardly and back in a manner analogous to that for section 28 in Fig. 3, thereby folding the conveyer into compact form for transportation on the highways. It will be seen that the self-feeding section shown in Fig. 7 can be applied to either end of the conveyer section shown in Figs. 1 and 3. In other words, this may be combined in any arrangement to suit the particular requirements of the type of work being conducted by the user.

While I have thus described and illustrated specific embodiments of the invention, I am aware that it can be embodied into many specific constructions, and I do not wish to be limited except as required by the scope of the appended claims, in which I claim:

1. The combination in a portable conveyer of a supporting frame, a pair of conveyer sections positioned in end to end relationship, adjoining ends thereof being pivotally supported on said frame for transfer of material from one to the other of said sections, said sections being swingable between inclined working positions and horizontally disposed transporting positions, the length of said supporting frame being substantially less than the length of said conveyer sections, and the elevation of the points of support for said conveyer sections being in the region of the overall height of an automotive vehicle, power driven loading means pivotally supported on the end of the forward section remote from said pivotal support and projecting from the end of said section for engaging material to be conveyed and for transferring said material to the conveyer element of the section to which it is attached, said loading means being pivotally supported to swing between working positions beyond the end section to which it is attached and to a position beneath and approaching parallelism with the section on which it is supported when the latter occupies an elevated position to reduce the overall length of the conveyer, and a self-propelled vehicle positioned to carry said supporting frame for movement of the conveyer to bring said loading means into contact with said material.

2. The combination in a traveling conveyer adapted for rapid transport movement over the ground by an automotive vehicle, of a rigid supporting frame including a base, spaced upstanding side members and a transverse shaft connecting said side members at an elevated point, a pair of conveyer sections mounted in end to end relationship on said shaft for angular adjustment with respect to said suporting frame between working and transport positions, said sections projecting outwardly in opposite directions beyond said base, said sections being positioned with the discharge end of one section above the receiving end of the other to discharge material from one to the other, each of said sections comprising a beam portion, a conveyer band trained over said beam portion in a longitudinal direction, and brace members rigidly secured to the lower side of said beam portion forming therewith a rigid triangular conveyer frame having a long side formed by said beam portion, a short side extending downwardly to a plane adjacent said base and an upwardly sloping long side connecting the end of said short side with said beam portion to provide space beneath said sections when in the transport position for the elevated portions of said automotive vehicle, and means operative on the corners of said frames remote from said means for moving said sections between said positions.

3. The combination in a portable conveyer adapted for rapid transport movement over the ground by an automotive vehicle, of a rigid supporting frame structure including a base, spaced upstanding side members and a transverse shaft connecting said side members at an elevated point, a pair of conveyer sections mounted in end to end relationship on said shaft for angular adjustment with respect to said supporting frame, said sections being positioned with the discharge end of one above the receiving end of the other to discharge material from one to the other, each of said sections comprising spaced beams, a conveyer band trained between said beam in a longitudinal direction, and laterally spaced depending and transverse brace members forming with said beam a rigid triangular conveyer frame structure, the short side of said conveyer frames projecting downwardly from said shaft, the breadth of said sections being less than the distance from said base to said shaft and the conveyer frames being shaped to interfit at the short sides in certain positions of said sections, and means operative on the corners of said triangular frames remote from said beams for moving said conveyer sections between adjusted positions.

4. The combination in a traveling conveyer adapted for rapid transport movement over the ground by an automotive vehicle, of a rigid supporting frame including a base, spaced upstanding side members, and a transverse shaft connecting said side members at an elevated point, a pair of conveyer sections mounted in end to end relationship on said shaft for angular adjustment with respect to said supporting frame, said sections projecting outwardly in opposite directions beyond said base, and being positioned with the discharge end of one section above the receiving end of the other to discharge material from one to the other, each of said sections comprising a beam portion, a conveyer band trained over said beam portion in a longitudinal direction, and brace members rigidly secured to the lower side of said beam portion forming therewith a rigid triangular conveyer frame having a long side formed by said beam portion, a short side extending downwardly to a plane adjacent said base, and an upwardly sloping long side connecting the end of said short side with said beam portion toward the free end thereof, and an automotive vehicle for transporting said conveyer disposed beneath said conveyer with the elevated portions thereof disposed in the space beneath the area defined by the frame of one of said sections.

5. The combination in a traveling conveyer adapted for rapid transport movement over the ground by an automotive vehicle, of a rigid supporting frame including a base, spaced upstanding side members, and a transverse shaft connecting said side members at an elevated point, a pair of conveyer sections mounted in end to end relationship on said shaft for angular adjustment with respect to said supporting frame, said sections projecting outwardly in opposite directions beyond said base, and being positioned with the discharge end of one section above the receiving end of the other to discharge material from one to the other, each of said sections comprising a beam portion, a conveyer band trained over said beam portion in a longitudinal direction, and brace members rigidly secured to the lower side of said beam portion forming therewith a rigid triangular conveyer frame having a long side formed by said beam portion, a short side extending downwardly to a plane adjacent said base, and an upwardly sloping long side connecting the end of said short side with said beam portion toward the free end thereof, an automotive vehicle for transporting said conveyer disposed beneath said conveyer with the elevated portions thereof disposed in the space beneath the area defined by the frame of one of said sections, and means connecting said vehicle and said conveyer for driving said conveyer band from the power plant of said vehicle.

6. The combination in a traveling conveyer adapted for rapid transport movement of a truck having a frame and a cab supported on a portion thereof, a rigid supporting frame disposed on said truck frame including spaced upstanding side members and a transverse shaft connecting said side members at an elevation near the top of said cab, a pair of conveyer sections mounted in end to end relationship on said shaft for angular adjustment with respect to said supporting frame, one of said sections projecting over said cab and the other section projecting rearwardly from said truck, said sections being positioned with the discharge end of one section above the receiving end of the other to discharge material from one to the other, each of said sections comprising a beam portion, a conveyer band trained over said beam portion in a longitudinal direction, and brace members rigidly secured to the lower side of said beam portion forming therewith a rigid triangular conveyer frame having a long side formed by said beam portion, a short side extending downwardly to a plane adjacent said truck frame, and an upwardly sloping long side connecting the end of said short side with said beam portion toward the free end thereof, means for driving said conveyer band from the power plant of said truck, and means acting on the end of said short side for angularly adjusting the positions of said sections between inclined working positions and positions suitable for transport.

7. The combination in a traveling conveyer adapted for rapid transport movement over the ground by an automotive vehicle, of a rigid supporting frame including a base, spaced upstanding side members and a transverse shaft connecting said side members at an elevated point, a pair of conveyer sections mounted in end to end relationship on said shaft for angular adjustment with respect to said supporting frame between working and transport positions, said sections projecting outwardly in opposite directions beyond said base, said sections being positioned with the discharge end of one section above the receiving end of the other to discharge material from one to the other, each of said sections comprising a beam portion, a conveyer band trained over said beam portion in a longitudinal direction, and brace members rigidly secured to the lower side of said beam portion forming therewith a rigid triangular conveyer frame having a long side formed by said beam portion, a short side extending downwardly to a plane adjacent said base and an upwardly sloping long side connecting the end of said short side with said beam portion to provide space beneath said sections when in the transport position for the elevated portions of said automotive vehicle, and means operative on the corners of said frames remote from said means for moving said sections between said positions, a power operated pick-up device carried wholly on the end of one of said sections, means for driving said conveyer band, and means for driving said pick-up device from the conveyer band of the section upon which it is carried.

8. The combination recited in claim 7 wherein said pick-up device is pivotally mounted on the end of said section and is swingable from a projected working position to a folded position adjacent to the section upon which it is mounted, and the last mentioned means comprises driving elements operative about a center to retain driving relationship in all positions of said device.

9. The combination recited in claim 2 including means for angularly adjusting said conveyer sections comprising cables operating between said supporting frame and the ends of said short side, to rotate said sections about said shaft as a center.

10. The combination in a traveling conveyer adapted for rapid transport movement over the ground by an automotive vehicle, of a rigid supporting frame extending upwardly to an elevated point, a pair of conveyer sections mounted in end to end relationship on the upper portion of said frame for angular adjustment between working and transport positions, said sections projecting outwardly in opposite directions from said frame, said sections being positioned with the discharge end of one section above the receiving end of the other to discharge material from one to the other, each of said sections comprising a beam portion in a longitudinal direction, means for moving said sections between said working and said transport positions, a further section equipped with power driven loading means pivotally secured at its end to the free end of one of said sections for transfer of material therebetween, and means for rotating said further section between an extended conveying position and a folded position.

11. The combination in a traveling conveyer adapted for rapid transport movement over the ground by an automotive vehicle, of a rigid supporting frame extending upwardly to an elevated point, a pair of conveyer sections mounted in end to end relationship on the upper portion of said frame for angular adjustment between working and transport positions, said sections projecting outwardly in opposite directions from said frame, said sections being positioned with the discharge end of one section above the receiving end of the other to discharge material from one to the other, each of said sections comprising a beam portion and a conveyer band trained over said beam portion in a longitudinal direction, means for moving said sections between said working and said transport positions, and a further conveyer section equipped with power driven loading means secured to the free end of one of said sections for transfer of material therebetween.

HAROLD H. COOK.